(12) United States Patent
Kobayashi et al.

(10) Patent No.: US 8,181,267 B2
(45) Date of Patent: May 15, 2012

(54) SCANNING-TYPE PROBE MICROSCOPE

(75) Inventors: Kanji Kobayashi, Kyoto (JP); Hideo Nakajima, Nagaokakyo (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 13/073,735

(22) Filed: Mar. 28, 2011

(65) Prior Publication Data
US 2011/0307979 A1 Dec. 15, 2011

(30) Foreign Application Priority Data
Jun. 11, 2010 (JP) .................................. 2010-133613

(51) Int. Cl.
*G01Q 20/00* (2010.01)

(52) U.S. Cl. ........................ 850/5; 850/1; 850/6; 850/63

(58) Field of Classification Search .................. None
See application file for complete search history.

(56) References Cited

U.S. PATENT DOCUMENTS

| | | | | |
|---|---|---|---|---|
| 5,461,605 A | * | 10/1995 | Takimoto et al. | 369/126 |
| 5,821,409 A | * | 10/1998 | Honma et al. | 73/105 |
| 6,017,590 A | * | 1/2000 | Lindsay et al. | 427/430.1 |
| 2011/0048115 A1 | * | 3/2011 | Ota et al. | 73/64.56 |

FOREIGN PATENT DOCUMENTS

| | | |
|---|---|---|
| JP | 11-142418 | 5/1999 |
| JP | 11142418 A * | 5/1999 |

* cited by examiner

*Primary Examiner* — David A Vanore
*Assistant Examiner* — Andrew Smyth
(74) *Attorney, Agent, or Firm* — DLA Piper LLP (US)

(57) ABSTRACT

To provide a scanning probe microscope wherein the scanning means is not damaged by fluids, the scanning probe microscope 30 comprises a cantilever support part 2 for supporting a cantilever 1; displacement measurement parts 3, 4, 5 and 6 for measuring the displacement of the cantilever 1; a specimen container 11 comprising sidewalls 19 and bottom surface 18 and containing a fluid 10 and a specimen S; a carrying stage 40 on which the specimen container 11 is placed; and a scanning means 7 for moving and scanning the carrying stage 40. While the cantilever 1 is immersed in the fluid 10 that is contained in the specimen container 11, the carrying stage 40 is moved, and the displacement of the cantilever 1 is measured. The scanning probe microscope 30 further comprises a ring-shaped protective mat 50 that is capable of absorbing the fluid 10. A mounting mechanism 43 is formed on the outer peripheral surface of the carrying stage 40 for removably attaching the protective mat 50 by its inner peripheral area.

6 Claims, 9 Drawing Sheets

SCANNING-TYPE PROBE MICROSCOPE

CROSS-REFERENCE TO THE RELATED APPLICATIONS

This application claims the benefit of priority under 35 USC 119 to Japanese Patent Application No. 2010-133613, the entire contents of which are incorporated herein by reference.

TECHNICAL FIELD

The present invention relates to a scanning probe microscope and in particular to a scanning probe microscope that is well suited for observing the surfaces of specimens in a fluid.

BACKGROUND TECHNOLOGY

One example of a scanning probe microscope is an atomic force microscope (AFM) which measures atomic forces that operate between a probe (cantilever) and the surface of a specimen (non-conductive specimen such as an insulator and biological or organic molecules) to observe the shape of the specimen's surface.

FIG. 5 shows a schematic view of the configuration of a scanning probe microscope. FIG. 6 shows a plan view of a previous scanning probe microscope. FIG. 7 shows a sectional view taken along line C-C in FIG. 6. FIG. 8 shows a sectional view taken along line D-D in FIG. 6.

The scanning probe microscope 130 includes a cantilever support part 2 which supports cantilever 1, displacement measurement parts 3, 4, 5 and 6 for measuring the displacement of cantilever 1, a disk-shaped carrying stage 140 on which a specimen S is placed, a piezo scanner (scanning means) 107 on whose upper surface the carrying stage 140 is installed, and a controller (not illustrated) (see for example Patent Literature 1).

The displacement measurement parts are not illustrated in FIG. 6 and FIG. 8.

The controller stores different measurement modes such as contact mode, constant height mode, non-contact mode and dynamic mode.

The "contact mode" is the mode wherein—while the controller performs a feedback control so that the reaction force between cantilever 1 and specimen S is kept constant—the surface of specimen S is scanned, and height is measured based on the amount of feedback. The "constant height mode" is the mode wherein—while the height of cantilever 1 is kept constant—the surface of specimen S is scanned, and height is measured based on the amount of deflection of cantilever 1. The "non-contact mode" is the mode wherein—while performing feedback control so that the force of attraction is kept constant between specimen S and the cantilever 1 oscillating near the resonance point—the surface of specimen S is scanned, and height is measured based on the amount of feedback. Furthermore, the "dynamic mode" is a mode wherein—while performing feedback control so that the reaction force is kept constant between specimen S and the cantilever 1 oscillating near the resonance point—the surface of specimen S is scanned, and height is measured based on the amount of feedback.

Cantilever support part 2 includes a cantilever 1, a light-transmissive, cylindrical support part body 21, a light-shielding support frame 22 for holding the support part body 21 and a rod-shaped support lever 24 for positioning the cantilever 1.

The cantilever 1 is in the form of a plate with, for example, a length of 100 µm and a thickness of 0.8 µm with a pointed probe disposed at its tip. The other end of the cantilever 1 is fixed to the bottom edge face of the cantilever support part 21 by means of a fixing jig 23. Any fixing means such as a screw, spring or a like mechanism may be used as the fixing jig 23. In other words, a person performing the measurement can select and use a cantilever 1 out of a plurality of types of cantilevers to suit the specimen S or the purpose of the measurement.

The support part body 21—further described below in detail—includes two holes that penetrate it in the vertical direction. Formed in one of the penetrating holes is an infusion tube 12 for introducing a fluid 10. Formed in the other penetrating hole is a discharge tube 13 for discharging the fluid 10.

The support frame 22 includes a light-shielding, square-shaped upper surface and a light-shielding, cylindrical sidewall that surrounds the perimeter of the upper surface. Formed in the center of the upper surface is a circular opening where the support part body 21 is attached. A support lever 24 is attached to the sidewall so that it protrudes, horizontally outward. Furthermore, a portion of the sidewall on the support lever 24 side of the support frame 22 is cut out so that the positional relationship between the cantilever 1 and specimen. S can be viewed from the support lever 24 side.

The displacement measurement parts 3, 4, 5 and 6 include a laser light source 3 for emitting a laser beam, a beam splitter 4 for directing the emitted laser beam to the back surface (upper surface) of the cantilever 1, a mirror 5 for adjusting the direction of the laser beam that is reflected by the back surface of the cantilever 1 and a photodiode 6 for detecting the reflected laser beam. With this configuration, the afore-described various measurement modes use the fact that the direction of the laser beam reflected by the back surface of the cantilever 1 changes depending on the deflection (displacement) of cantilever 1. This fact is used to detect the shape of the surface of specimen S.

When seen in a plan view, the carrying stage 140 has a circular shape with a diameter of, for example, 15 mm and a thickness when viewed in a side elevation of 4 mm. Furthermore, a magnet 71 is disposed inside the carrying stage 140. Because of this, when a specimen container 11 is placed on the upper surface of the carrying stage 140, the force of attraction between a magnetic material 72 of the specimen container 11 and the magnet 71 in the carrying stage 40 causes the specimen container 11 to be fixed to the carrying stage 140. This is described in greater detail below.

The carrying stage 140 is integrally mounted to the upper surface of a piezo scanner 107 which uses piezo devices to scan the carrying stage 140 in the X-, Y- and Z-directions. This means that specimen S that is placed on the carrying stage 140 is scanned in the X-, Y- and Z-directions.

The shape of the surface of a specimen S that is located in air can be observed by placing the specimen S directly on the upper surface of the carrying stage 140. However, to observe the shape of the surface of a specimen S that is present in a solution (acidic or alkaline solution), a specimen container 11 containing a fluid 10 and specimen S is placed on the upper surface of the carrying stage 140.

The specimen container 11 such as the aforesaid comprises a circular, light-transmissive bottom surface 18, a cylindrical, light-transmissive sidewall 19 that surrounds the perimeter of the bottom surface 18 and a disk-shaped magnetic material 72 that is attached to the back side of the bottom surface 18. A person taking a measurement selects a particular specimen container 11 out of a choice of many so that the diameter of the bottom surface 18 and the height of the sidewall 19 of the specimen container 11 fit the outer diameter of the support part body 21, the inner diameter of the support frame 22, the size of the specimen S and the amount of movement of the specimen container 11.

The method for measuring and observing the shape of the surface of a specimen S that is present in a fluid 10 using a scanning probe microscope 130 is described next.

First, based on the size and the like of the specimen S, a person taking the measurement selects a specimen container 11. The specimen S is then placed on the bottom surface 18 of the specimen container 11. The specimen container 11 is then placed on the upper surface of the carrying stage 140. When this is done, the attractive force between the magnetic material 72 of the specimen container 11 and the magnet 71 that is disposed in the carrying stage 140 fixes the specimen container 11 to the carrying stage 140.

Next, after selecting a cantilever 1, the person taking the measurement uses the fixing jig 23 to fix the cantilever 1 to the cantilever support part 2. The cantilever support part 2 is then installed to a support rod 22. The support lever 24 is then operated to position the cantilever 1 inside the specimen container 11.

The person taking the measurement then introduces a fluid 10 through the infusion tube 12. The level of the fluid in the specimen container 11 should high enough so that at least the specimen S and the cantilever 1 are immersed in the fluid 10. Because the piezo scanner 107 may be damaged if the fluid 10 spills onto it, this operation should be performed with care so that the fluid 10 does not spill out of the specimen container 11.

A person taking the measurement uses the piezo scanner 107 to scan the specimen S in the X-direction, Y-direction and the Z-direction while measuring the displacement of cantilever 1 using the displacement measurement parts 3, 4, 5 and 6. Care is required in this operation so that fluid 10 does not spill out of the specimen container 11 by, for example, bumping the specimen container 11 against the support part body 21 or the support frame 22.

After the displacement of the cantilever 1 is measured, the person taking the measurement discharges the fluid 10 through the discharge tube 13.

Lastly, the person taking the measurement operates the support lever 24 and moves the cantilever 1. The specimen container 11 is then removed from the upper surface of the carrying stage 140. During this operation as well, since all of the fluid 10 cannot be discharged through the discharge tube 13, care is necessary to not spill any of the fluid 10 remaining inside the specimen container 11.

PRIOR ART LITERATURE

Patent Literature

Patent Literature 1: JP 11-142418 A

SUMMARY OF THE INVENTION

Problems to be Solved by the Invention

However careful the person taking the measurement may be in trying not to spill the fluid 10 from the specimen container 11 when introducing the fluid 10 through the infusion tube 12, when scanning the specimen S in the X-, Y- and Z-directions using the piezo scanner 107 or when removing the specimen container 11 from the upper surface of the carrying stage 140, fluid 10 can at times spill from the specimen container 11. The spilled fluid 10 can then damage the piezo scanner 107.

Previous measures taken in response to avoid damages to the piezo scanner 107 in case of spillage of fluid 10 from the specimen container 11 included inserting between the upper surface of the carrying stage 140 and the bottom (magnetic material 72) of the specimen container 11a protective sheet 150 in the shape of a flat plate (diameter of 24 mm and thickness of 25 μm) made of a material (such as polyethylene) that is repellent to the fluid 10.

However, this means that droplets of the fluid 10 will collect on the upper surface of the protective sheet 150 that is made of a material repellent to the fluid 10. With this arrangement, when the fluid 10 spills from the specimen container 11, the piezo scanner 107 is not damaged. However, the droplets of the fluid 10 that collect on the surface of the protective sheet 150 can spill onto the piezo scanner 107 when the protective sheet 150 is removed after the measurements are taken.

Also, as the specimen container 11 is removed from the upper surface of the carrying stage 140, the protective sheet 150 can fall off from the upper surface of the carrying stage 140, resulting in droplets of the fluid 10 that have collected on the surface to spill onto the piezo scanner 107.

It is therefore the object of the present invention to provide a scanning probe microscope wherein the scanning means is not damaged by the fluid.

Means for Solving the Problem

To solve the above problems, the scanning probe microscope according to the present invention includes: a cantilever support part for supporting a cantilever; displacement measurement parts for measuring the displacement of the cantilever; a specimen container including sidewalls and bottom surface and containing a fluid and a specimen; a carrying stage on which the specimen container is placed; and a scanning means for moving and scanning the carrying stage. While the cantilever is immersed in the fluid that is held in the specimen container, the carrying stage is moved, and the displacement of the cantilever is measured. The scanning probe microscope further comprises a ring-shaped protective mat that is capable of absorbing the fluid. A mounting mechanism is formed on the outer peripheral surface of the carrying stage for removably attaching the protective mat by its inner peripheral area.

Here, "scanning means" refers to a means for moving at least in one of the X-, Y- and Z-directions. An example is a piezo scanner which can be damaged by a fluid that seeps into it.

With the scanning probe microscope according to the present invention, even if the fluid spills from the specimen container, because a protective mat is installed around the outer peripheral surface of the carrying stage, the fluid is absorbed by the protective mat. Furthermore, since the fluid is absorbed by the protective mat, there are no droplets of the fluid that can spill onto the scanning means during the removal of the protective mat. Furthermore, during the removal of the specimen container from the upper surface of the carrying stage, the protective mat cannot inadvertently fall off from the upper surface of the carrying stage, resulting in droplets of the fluid to spill onto the scanning means.

Effects of the Invention

As afore-described, with the scanning probe microscope according to the present invention, the scanning means is not damaged by the fluid.

Means for Solving Other Problems and Effects

Furthermore, with the scanning probe microscope according to the present invention, the inner diameter of the protective mat can be smaller than the outer diameter of the carrying stage, and the aforesaid installation mechanism can be a concavity that caves in towards the center of the carrying stage.

With the scanning probe microscope according to the present invention, the protective mat can be easily installed and removed.

Also, with the scanning probe microscope according to the present invention, the protective mat may be constructed by the lamination of a water-absorbent fiber layer and a polyethylene layer.

Also, with the scanning probe microscope according to the present invention, the cantilever support part may be provided with an infusion tube for introducing a fluid into the specimen container that is placed on the carrying stage and a discharge tube for discharging the fluid from the specimen container that is placed on the carrying stage.

Furthermore, with the scanning probe microscope according to the present invention, the upper surface of the carrying stage may feature a flat surface having the same shape as the bottom of the specimen container and an inclined surface that protrudes outwardly that is formed at the outer edge of the flat surface.

With the scanning probe microscope according to the present invention, the specimen container can be easily positioned at a prescribed location on the upper surface of the carrying stage.

Furthermore, with the scanning probe microscope according to the present invention, the carrying stage may be detached from the scanning means.

With the scanning probe microscope according to the present invention, one of a plurality of types of carrying stages may be selected depending on factors such as the size of the specimen container, installed on the scanning means and used.

EMBODIMENTS OF THE INVENTION

Embodiments of the present invention are described next with reference to figures. Needless to say, the present invention is not limited to the embodiments described below and can be practiced in various ways without deviating from the gist of the invention.

Figure 1:
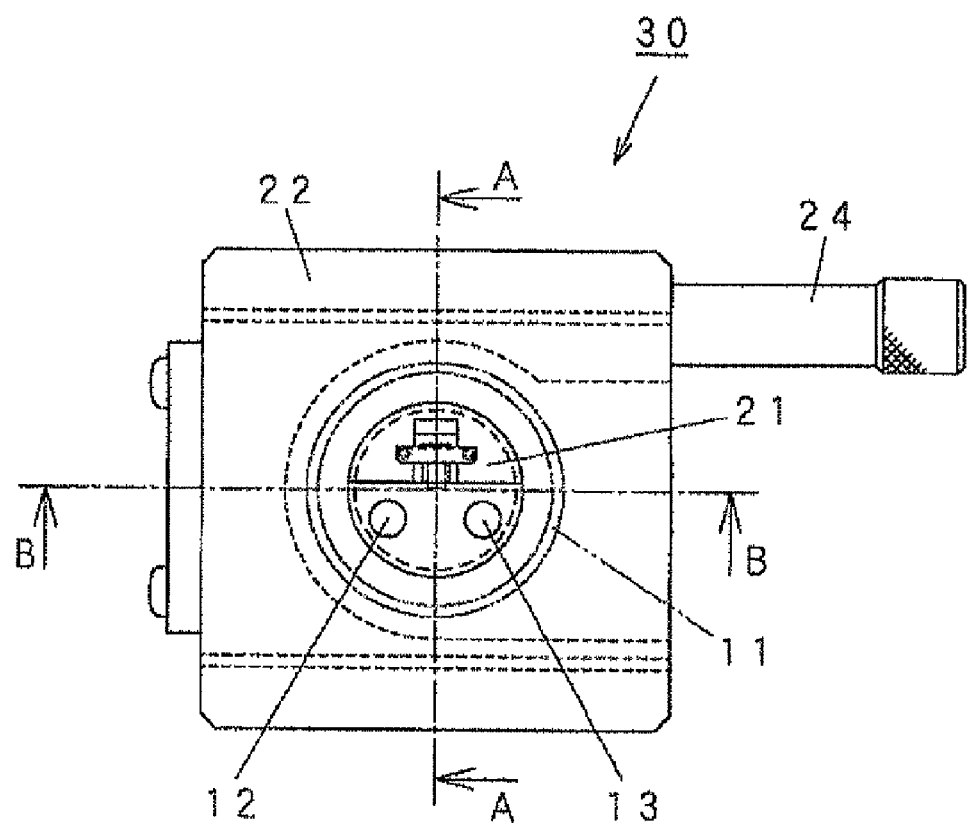
FIG. 1 shows a plan view of one embodiment of a scanning probe microscope according to the present invention.
Figure 2:
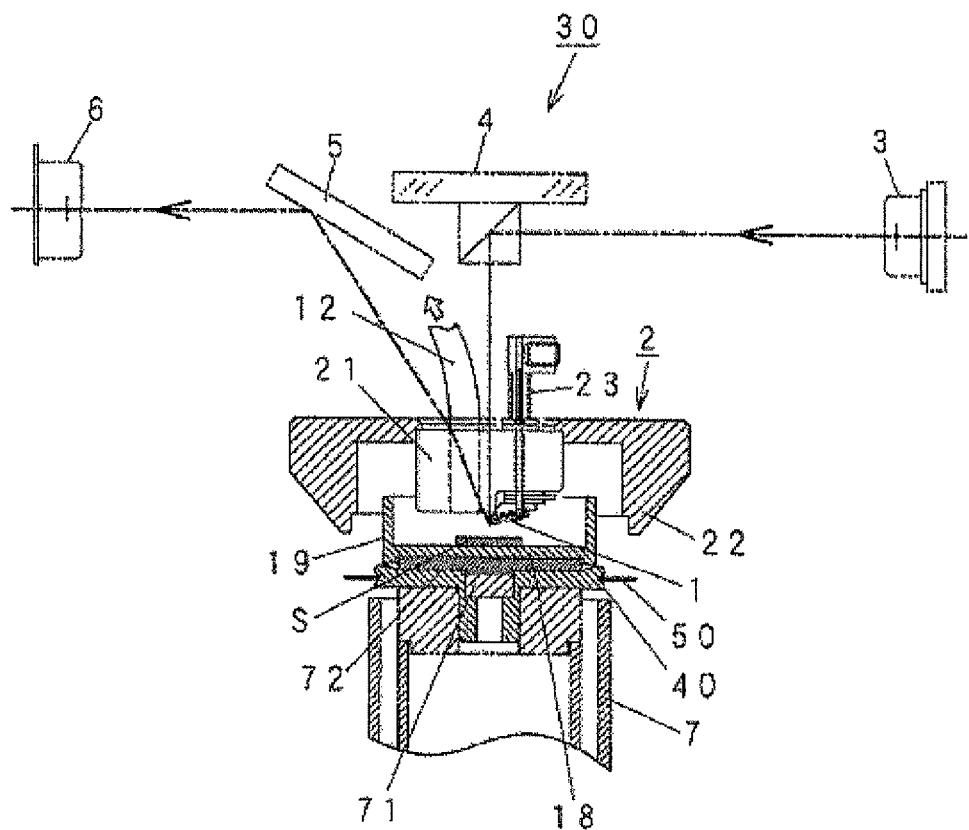
FIG. 2 shows a sectional view taken along line A-A shown in FIG. 1.
Figure 3:
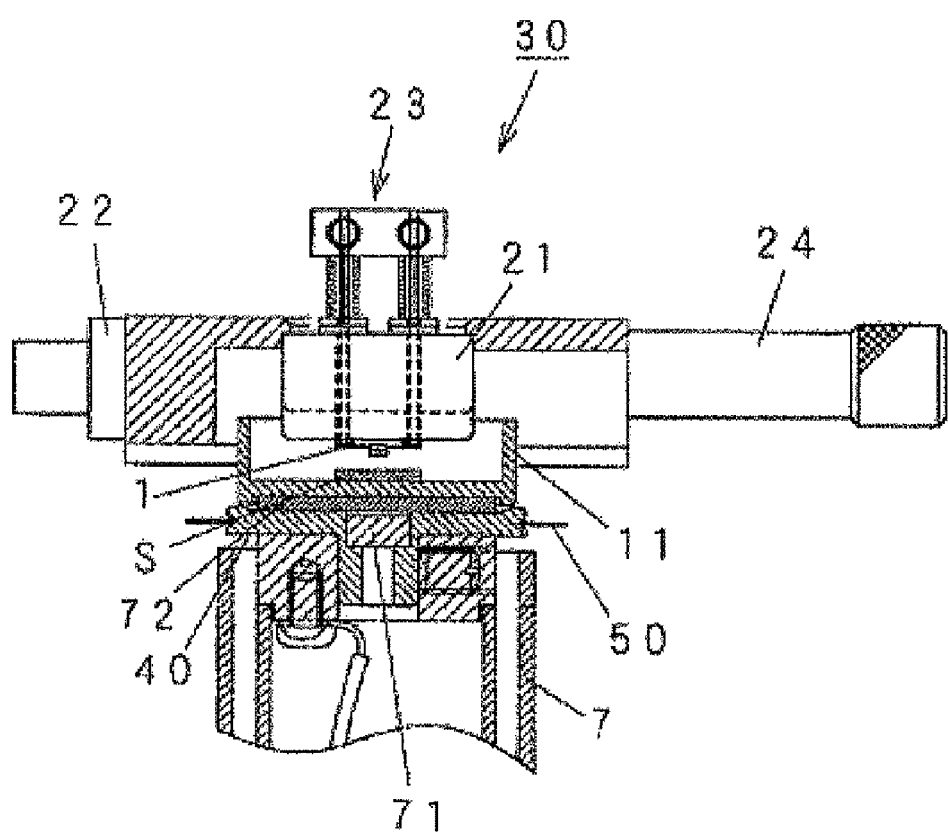
FIG. 3 shows a sectional view taken along line B-B shown in FIG. 1.
Figure 4:
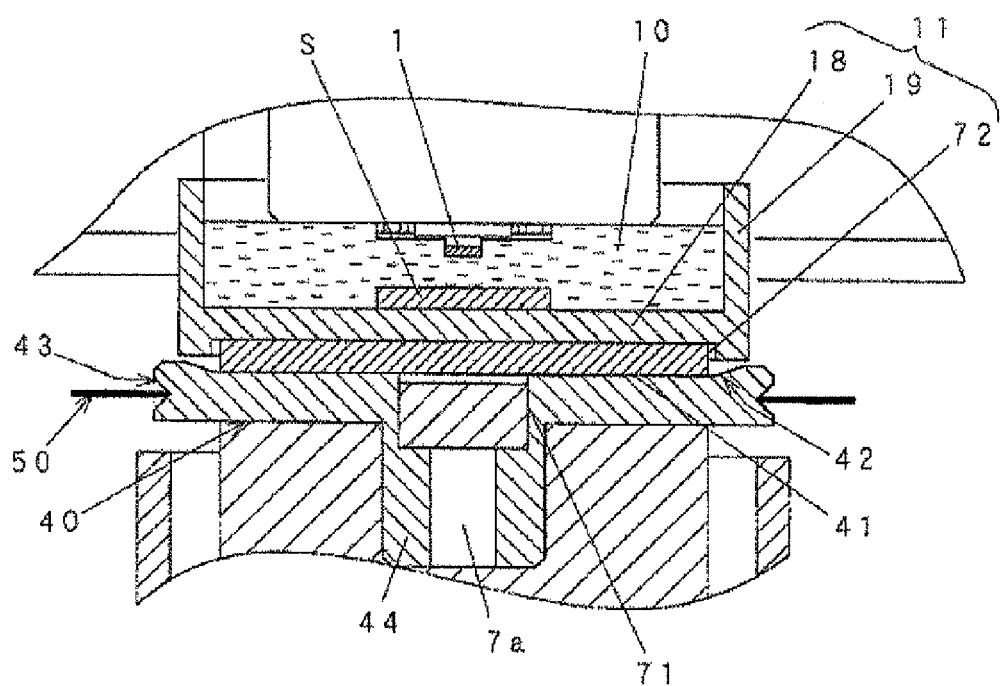
FIG. 4 shows an enlarged view of a portion of FIG. 1.
Figure 5:
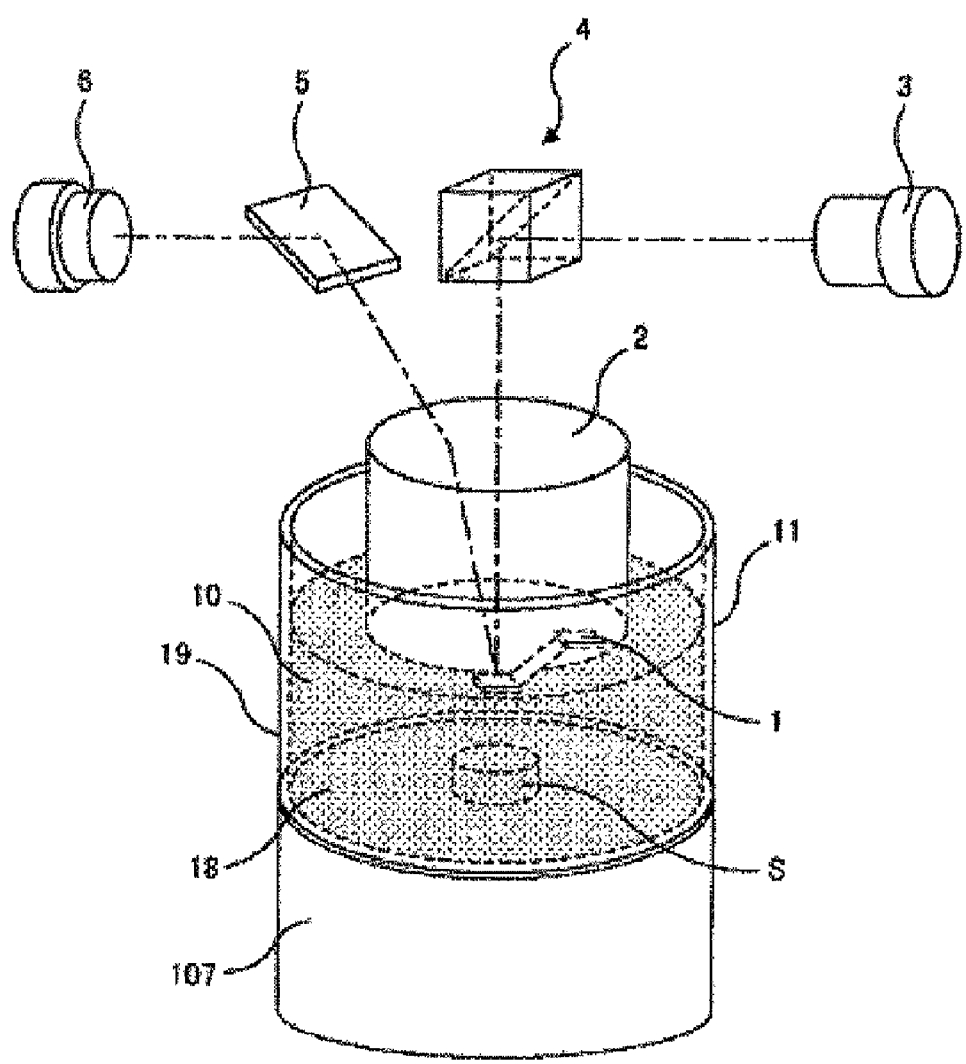
FIG. 5 is a schematic view showing the configuration of the scanning probe microscope.
Figure 6:
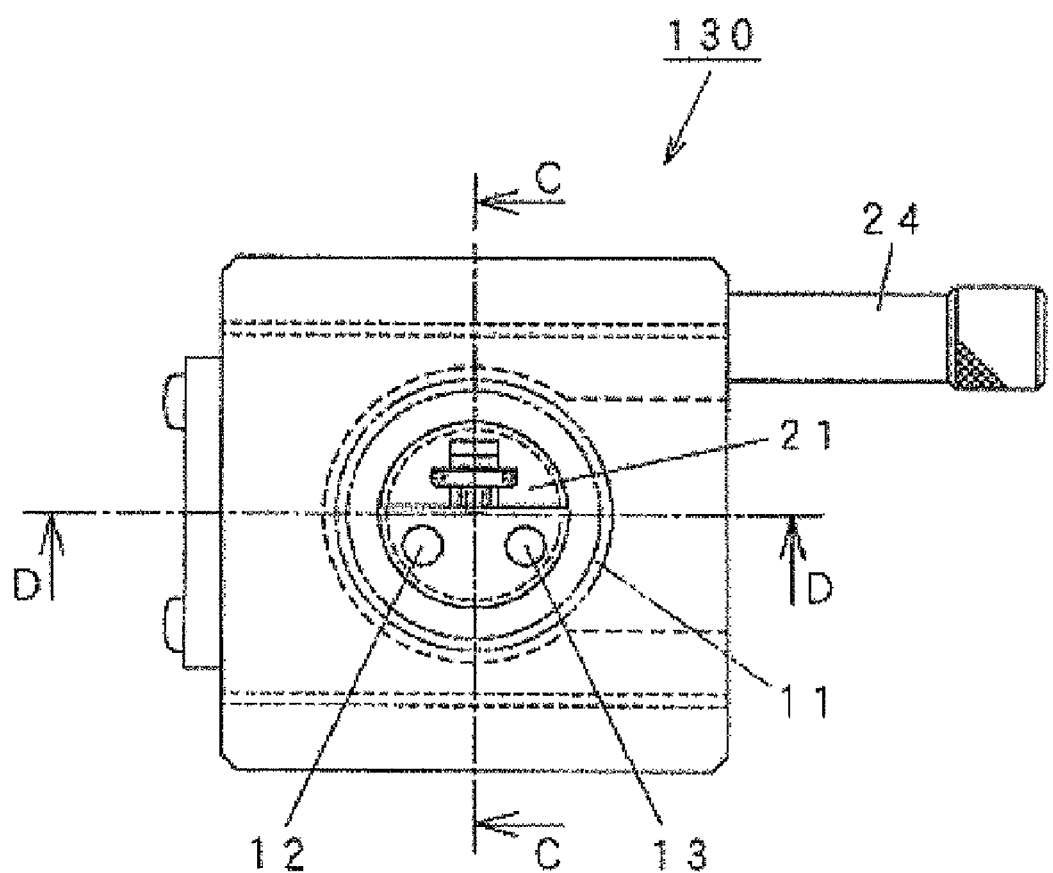
FIG. 6 shows a plan view of a previous scanning probe microscope.
Figure 7:
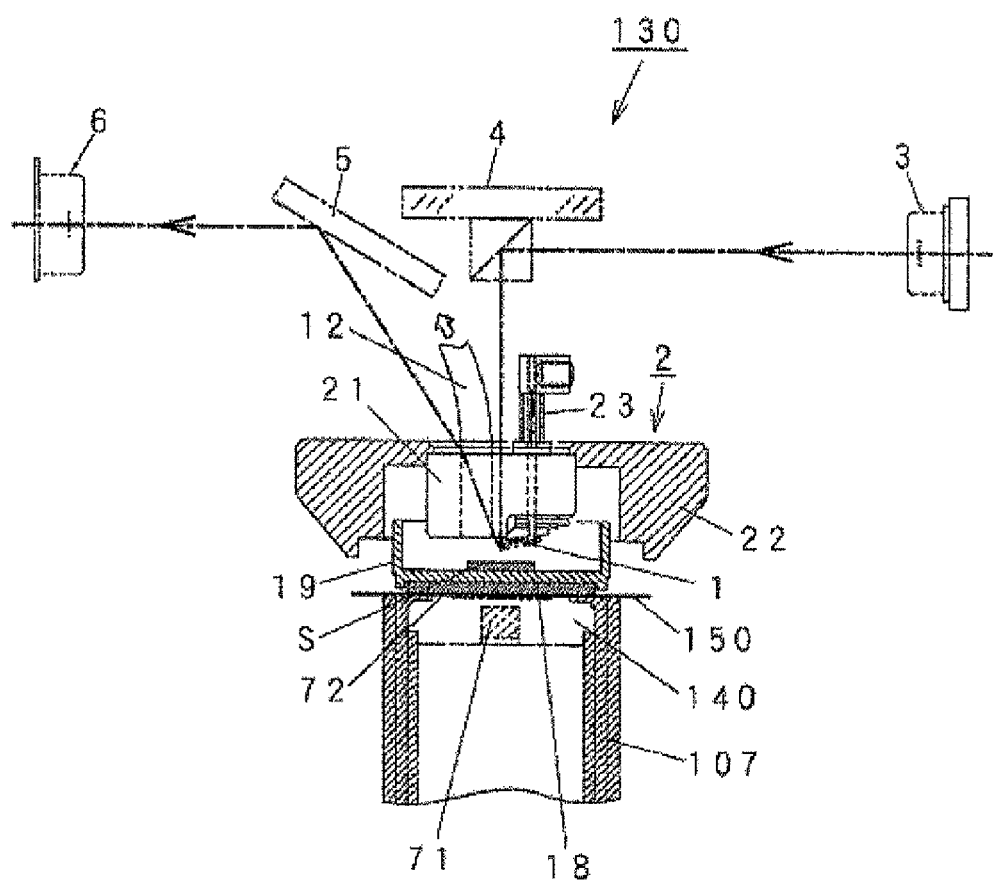
FIG. 7 shows a sectional view taken along line C-C shown in FIG. 6.
Figure 8:
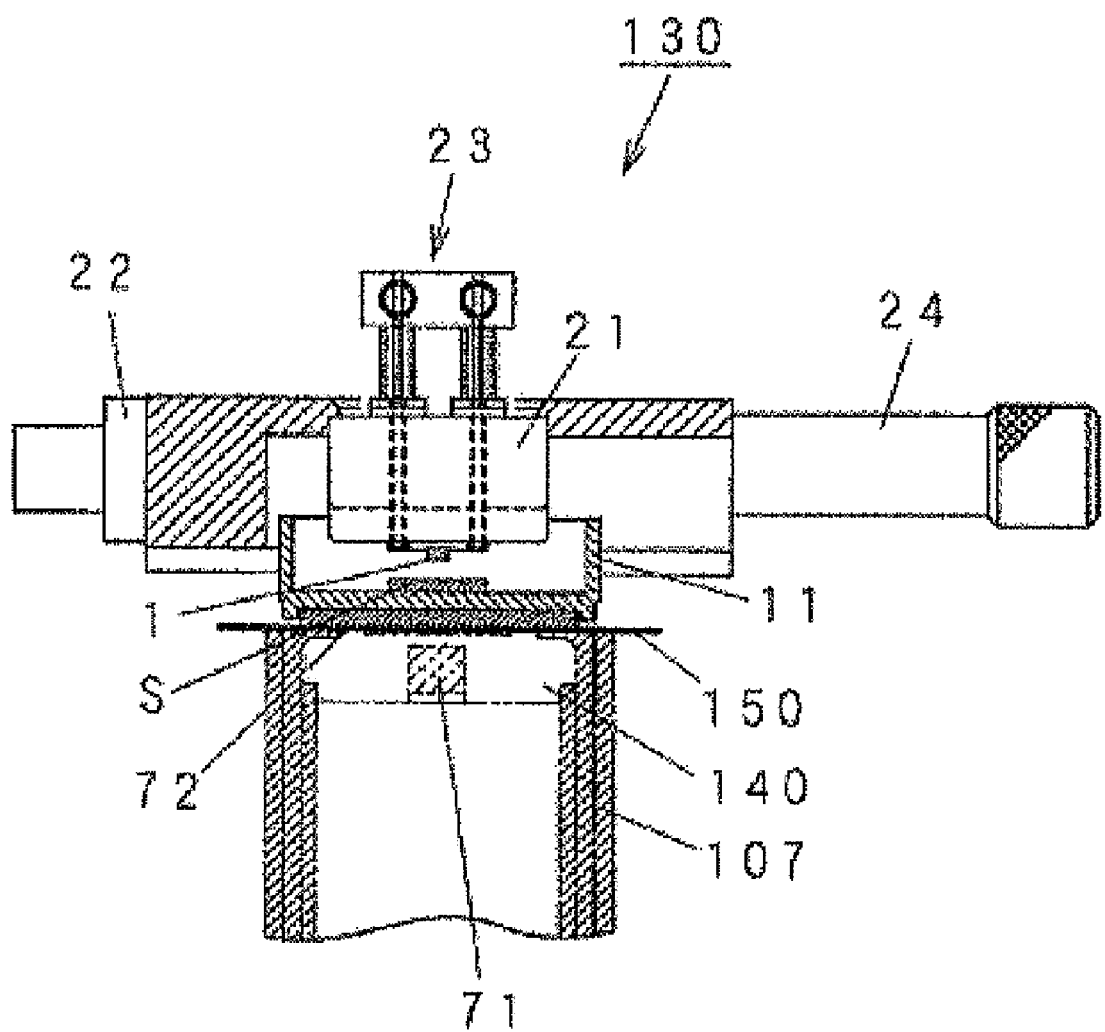
FIG. 8 shows a sectional view taken along line D-D shown in FIG. 6.
Figure 9:
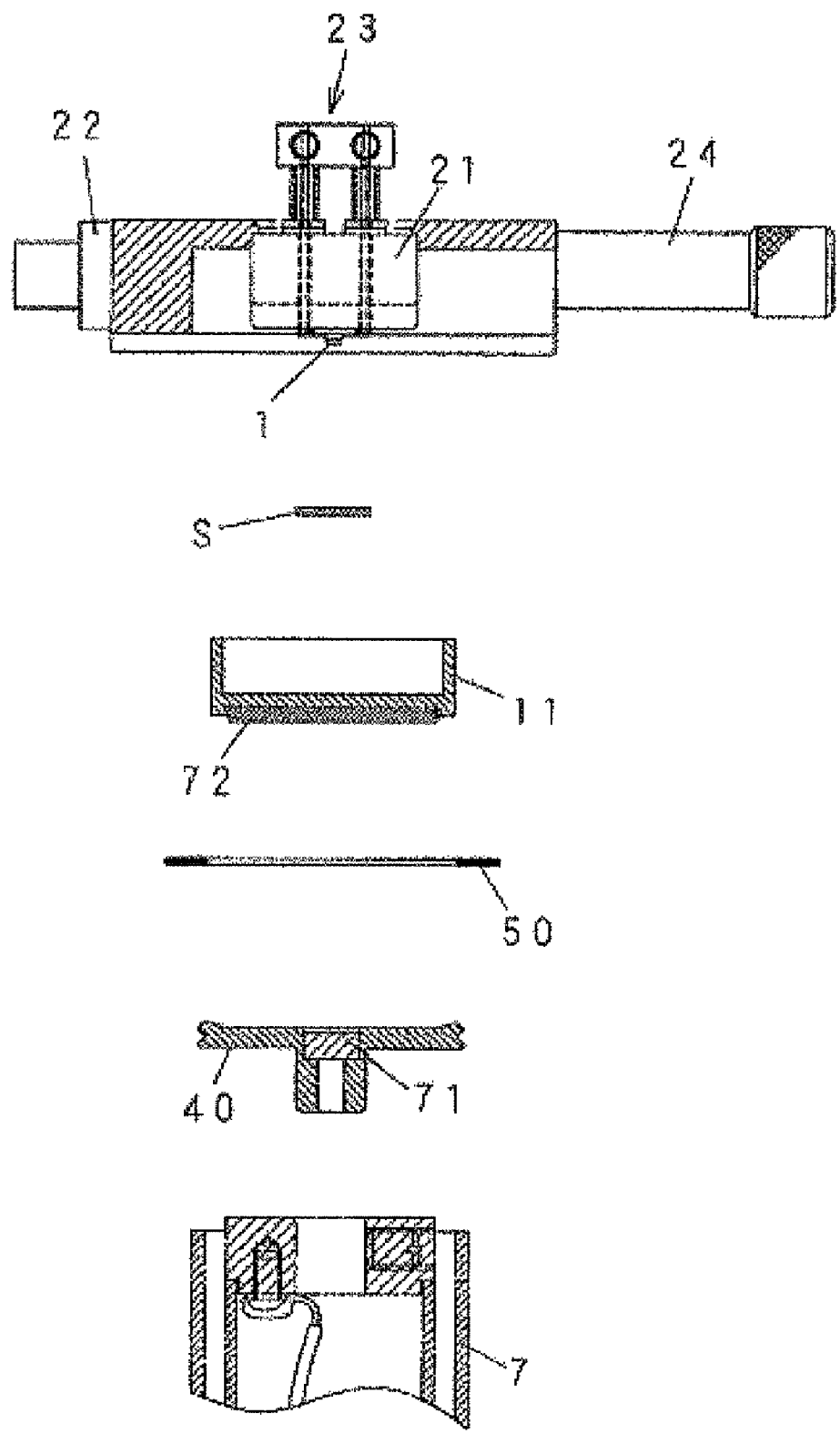
FIG. 9 shows an exploded sectional view.

FIG. 1 shows a plan view of one embodiment of a scanning probe microscope according to the present invention. FIG. 2 shows a sectional view taken along line A-A in FIG. 1. FIG. 3 shows a sectional view taken along line B-B in FIG. 1. FIG. 4 shows an enlarged view of a portion of FIG. 1 when containing fluid 10. FIG. 9 shows an exploded sectional view. The same reference numbers are used for similar components in scanning probe microscope 130. The parts used for measuring displacement are not illustrated in FIG. 1 and FIG. 3.

The scanning probe microscope 30 includes a cantilever support part 2 that supports cantilever 1, displacement measurement parts 3, 4, 5 and 6 for measuring the displacement of the cantilever 1, a disk-shaped carrying stage 40 on which a specimen S is placed, piezo scanner (scanning means) 7 on whose upper surface the carrying stage 40 is attached, a controller (not illustrated) and a protective mat 50.

In plan view, the protective mat 50 is ring-shaped with an inner diameter of 18 mm and an outer diameter of 20 mm and has a thickness in side elevation of 0.3 mm. The protective mat 50 is constructed by lamination of water-absorbent fiber layer that can absorb fluid 10 and polyethylene layer that is repellant to the fluid 10. Because, with this construction, the fluid 10 is absorbed by the water-absorbent fiber layer, droplets of the fluid 10 cannot collect on the surface of the protective mat 50.

The carrying stage 40 is circular and has a diameter of 19 mm in plan view and a thickness in side elevation of 2 mm. Formed on the top surface of the carrying stage 40 are a circular flat surface having the same shape as the bottom (magnetic material 72) of the specimen container 11 and an inclined surface 42 that protrudes upwardly towards the outer peripheral edge of the flat plane 41. The inclined surface protrudes upwardly with an angle of, for example, 15 degrees to 25 degrees which causes the specimen container 1 to be positioned at a prescribed position on the upper surface of the carrying stage 40.

Also, a groove (concavity) 43 that caves in towards the center of the carrying stage 40 is formed along the outer peripheral end surface of the carrying stage 40. Because the diameter of the carrying stage 40 is larger than the inner diameter of the protective mat 50 and since the protective mat 50 has some flexibility, the insertion of the protective mat 50 causes the protective mat 50 to be fixed in the groove 43. Furthermore, the diameter of the carrying stage 40 is smaller than the outer diameter of the protective mat 50, and the outer peripheral edge of the protective mat 50 protrudes outwardly beyond the outer periphery of the carrying stage 40.

Formed at the center of the lower surface of the carrying stage 40 is a cylindrical mounting piece 44 that extends downwardly and which can be inserted into the mounting hole 7a for a piezo scanner 7. In other words, depending on the size of the specimen container 11, a carrying stage 40 can be selected and installed from among a plurality of types of carrying stages 40.

Furthermore, a magnet 71 is disposed inside the mounting piece 44. Once the specimen container 11 is placed on the carrying stage 40, the force of attraction between the magnetic material 72 of the specimen container 11 and the magnet 71 disposed on the carrying stage 40 causes the specimen container 11 to be secured to the carrying stage.

The manner in which the scanning probe microscope 30 is used to observe the shape of the surface of a specimen S present in a fluid 10 is described next. (See FIG. 9.)

First, a person taking the measurement selects a specimen container 11 based on such factors as the size of the specimen S and also selects a carrying stage 40 based on such factors as the size of the specimen container 11. Next, the protective mat 50 is installed on the outer peripheral surface of the carrying stage 40 so that the upper surface becomes the water-absorbent fiber layer. The carrying stage 40 is then installed on the piezo scanner 7.

Next, the person taking the measurement positions the specimen S on the bottom surface 18 of the specimen container 11. The specimen container 11 is then placed on the upper surface of the carrying stage 40. Because an inclined surface 42 is formed on the upper surface of the carrying stage 40, the specimen container 11 can be easily positioned at a predetermined position on the upper surface of the carrying stage 40.

Next, the person taking the measurement selects a cantilever 1 and fixes it to the cantilever support part 2 using the fixing jig 23. The cantilever support part 2 is then installed on the support frame 22. The support lever 24 is then operated to position the cantilever 1 inside the specimen container 11.

The person taking the measurement then introduces a fluid 10 through the infusion tube 12. The level of the fluid within the specimen container 11 should be high enough so that at least the specimen S and the cantilever 1 are immersed in fluid 10. Even if the fluid 10 were to spill from the specimen container 11 during this operation, the spilled fluid is absorbed by the water-absorbent fiber layer of the protective mat 50.

The person taking the measurement scans the specimen S in the X-, Y- and Z-directions using the piezo scanner 7 while measuring the displacement of cantilever 1 using the displacement measurement parts 3, 4, 5 and 6. During this operation, even if the fluid 10 were to spill from the specimen container 11, for example, by bumping the specimen container 11 against the support part body 21 or the support frame 22, the spilled fluid is absorbed by the water-absorbent fiber layer of the protective mat 50.

After measuring the displacement of the cantilever 1, the person taking the measurement discharges the fluid 10 through the discharge tube 13.

Lastly, the person taking the measurement operates the support lever 24 and moves the cantilever 1 and then removes the specimen container 11 from the upper surface of the carrying stage 40. When doing this, since the protective mat 50 is installed on the outer peripheral surface of the carrying stage 40, the protective mat 50 does not drop off when the specimen container 11 is removed from the upper surface of the carrying stage 140.

When the person taking the measurement believes that the time has come for the protective mat 50 to be replaced, the protective mat 50 is replaced with a new protective mat 50.

As afore-described, with the scanning probe microscope 30, piezo scanner 7 is not damaged by the fluid 10.

FEASIBILITY FOR INDUSTRIAL USE

The present invention can be used, for example, with scanning probe microscopes which are well suited for the observation of the surfaces of specimens present in a fluid.

DESCRIPTION OF THE NUMERICAL REFERENCES

1. Cantilever
2. Cantilever support part
3, 4, 5, 6. Displacement measurement part
7. Piezo scanner (scanning means)
10. Fluid
11. Specimen container
18. Bottom surface
19. Sidewall
30. Scanning probe microscope
40. Carrying stage
43. Groove (mounting mechanism)
50. Protective mat

What is claimed is:

1. A scanning probe microscope comprising:
   a cantilever support part for supporting a cantilever;
   a displacement measurement part for measuring the displacement of said cantilever;
   a specimen container comprising a sidewall and a bottom surface for containing a fluid and specimen;
   a carrying stage on which said specimen container is placed; and
   a scanning means for moving and scanning said carrying stage;
   said scanning probe microscope measuring the displacement of said cantilever while moving said carrying stage with said cantilever being positioned in a fluid that is contained in the specimen container; and
   a ring-shaped protective mat that is formed from a material that is capable of absorbing said fluid and a mounting mechanism that is formed on the outer peripheral surface of said carrying stage to allow said protective mat to be removably attached by the inner peripheral area of said protective mat.

2. The scanning probe microscope according to claim 1 wherein the inner diameter of said protective mat is smaller than the outer diameter of said carrying stage and said mounting mechanism is a concavity that caves in towards the center of said carrying stage.

3. The scanning probe microscope according to either of claim 1 wherein said protective mat is a laminate of water-absorbent fiber layer and polyethylene layer.

4. The scanning probe microscope according to claim 1 wherein said cantilever support part comprises an infusion tube for introducing a fluid into a specimen container that is placed on said carrying stage and a discharge tube for discharging a fluid from a specimen container that is placed on said carrying stage.

5. The scanning probe microscope according to claim 1 wherein a flat surface having the same shape as the bottom of said specimen container and an inclined surface that protrudes upwardly from the outer peripheral edge of said flat surface are formed on the upper surface of said carrying stage.

6. The scanning probe microscope according to claim 1 wherein said carrying stage is removable from said scanning means.

* * * * *